(12) United States Patent
Lipp

(10) Patent No.: US 7,244,894 B1
(45) Date of Patent: Jul. 17, 2007

(54) GROMMET FOR A VEHICLE DOOR ASSEMBLY

(75) Inventor: Douglas Christian Lipp, Ann Arbor, MI (US)

(73) Assignee: Yazaki North America, Inc., Canton, MI (US)

( * ) Notice: Subject to any disclaimer, the term of this patent is extended or adjusted under 35 U.S.C. 154(b) by 46 days.

(21) Appl. No.: 11/236,579

(22) Filed: Sep. 28, 2005

(51) Int. Cl.
*H02G 3/18* (2006.01)
(52) U.S. Cl. .............. 174/650; 174/153 G; 174/152 G; 174/135; 16/2.1; 16/2.2; 248/56
(58) Field of Classification Search .............. 174/65 G, 174/153 G, 152 G, 650, 152 R, 142, 72 A, 174/135, 652, 656, 665, 668, 669; 16/2.1, 16/2.2; 439/604, 587, 274, 275; 248/56; D8/400; 249/146.5, 146.2, 146.9, 146.11
See application file for complete search history.

(56) References Cited

U.S. PATENT DOCUMENTS

| | | | |
|---|---|---|---|
| 3,053,564 A | 9/1962 | Evans et al. | |
| 5,405,672 A * | 4/1995 | Takiguchi et al. | ....... 296/146.5 |
| 5,588,260 A * | 12/1996 | Suzuki et al. | ............ 296/146.5 |
| 6,051,790 A * | 4/2000 | Takeuchi et al. | .......... 174/72 A |
| 6,278,060 B1 | 8/2001 | Mori | |
| 6,297,449 B1 | 10/2001 | Dagtekin | |
| 6,303,869 B1 * | 10/2001 | Shanahan et al. | ........ 174/153 G |
| 6,312,046 B1 * | 11/2001 | Sora et al. | .............. 174/152 G |
| 6,431,642 B2 * | 8/2002 | Sora et al. | .............. 174/152 G |
| 6,479,748 B2 | 11/2002 | Mori | |
| 6,660,937 B1 | 12/2003 | MacLeod et al. | |
| 6,779,243 B2 * | 8/2004 | Nakata | .................... 174/153 G |
| 6,901,627 B2 | 6/2005 | Uchida | |
| 7,053,304 B2 * | 5/2006 | Ojima et al. | ............... 174/72 A |
| 2002/0046863 A1 | 4/2002 | Heranney | |

* cited by examiner

*Primary Examiner*—Angel R. Estrada
(74) *Attorney, Agent, or Firm*—Daniel R. Edelbrock

(57) ABSTRACT

A grommet routes a wire harness from an inner side of a vehicle door into a vehicle body. A depression wraps around an edge of the door with a first part on a hinge surface of the door and a second part on the inner side. The grommet has an elastic member for fitting within the first part and a rigid retainer member extending around the edge into the second part. The members are secured together. The elastic member has a grooved periphery for receiving a flange surrounding an opening linked to the first part of the depression. The retainer member is secured in the second part of the depression by a fastener inserted into an aperture in the second part. The members have passageways to route the harness around the edge of the door. Fins on an underside of the elastic member seal against the first part.

18 Claims, 4 Drawing Sheets

GROMMET FOR A VEHICLE DOOR ASSEMBLY

BACKGROUND OF THE INVENTION

1. Field of the Invention

This invention relates in general to grommets and more particularly to a two-piece grommet that wraps around the edge of a vehicle door in a pre-formed depression to route the harness from a wet side to a dry side of the door.

2. Discussion of Related Art

The process of automobile assembly is evolving to increasingly include pre-assembled modules provided to the final assembly plants of the vehicle manufacturers. An example of this is a door cassette module, comprising pre-assembled door components and wiring. Previous grommets were fit into an aperture in a hinge face of the door to route a wire harness from the vehicle electrical system into the interior of the door. However, this is cumbersome to assemble when the internal wiring of the door is required to be pre-routed on the door cassette module. In addition, the door cassette module requires a grommet that wraps around a hinge face of the door.

Current designs for these grommets are generally complex, require tolerances that are difficult to hold, need expensive molding and assembly processes, and require covers to protect long, delicate sealing edges during shipping of the module. Typically, a plastic retainer for receiving the wire harness is fit into a recess in the hinge face of the door. In one case, a steel plate over-molded with a rubber grommet is bolted to the door over the retainer. Additional components, such as the bolts, are relatively expensive. In another case, the retainer is secured in the depression by a plastic fastener and a rubber grommet is stretched over a lid for the retainer. This is a fragile design, and stretching the grommet over the lid is a difficult and critical assembly step. Both designs, the over-molded steel plate and the grommet stretched over the lid, need to be rigid to provide a force against an extended sealing surface. Feeding circuits through a hole in a steel plate or through a fragile grommet must be done carefully and is therefore time-consuming. In either case, if the tolerance or assembly prerequisites are not consistently met, the grommets do not waterproof the door wiring.

The grommet disclosed in U.S. Pat. No. 6,479,748 is an example of a prior art device for routing a wire harness from one side of a door to another. A unitary grommet is designed for use on a door body having an L-shaped opening into an interior of the door. The L-shaped opening is continuous around an edge of the door from a front surface to a side surface facing the passenger compartment. The front surface of the door includes attachment provisions for a weather strip. The grommet has front and side portions formed together at a right angle. The front portion has a recess for receiving part of the weather strip as it extends over the grommet. A wire harness protecting portion extends diagonally from the front portion to the side portion. A bellows portion stretches from the front portion to the vehicle. The wire harness is passed through the bellows portion and the front portion into the diagonal wire harness protecting portion and then out through a hole in the side portion. A groove with an adjacent outer sealing lip extends around the entire periphery of the grommet. The diagonal wire harness protecting portion is temporarily deformed during assembly to fit the edge of the L-shaped opening into the grommet groove to secure the grommet in place on both surfaces of the door. An interior trim piece is placed over the passenger side of the door to cover the harness where it is routed to the door components such as lock and window controls. The lip has to tightly seal around the entire L-shaped opening and has to secure the grommet in the opening. This means that tolerances must be carefully met. Also, it must be made difficult to deform the grommet during assemble in order to create a tight fit.

Multi-part grommets are known in the art, for example as shown in U.S. Pat. No. 6,901,627. This grommet has a flexible body for receiving and routing the harness, and a rigid inner member. The inner member extends through an opening in a vehicle panel and attaches the flexible body to the panel. This type of grommet is generally used to pass a harness directly through a vehicle panel and would be difficult to adapt to perform turning and sealing functions around the edge of a door.

SUMMARY OF THE INVENTION

Accordingly, it is an object of this invention to provide a two-piece grommet for efficiently routing and sealing a wire harness from a dry side to a wet side of a vehicle door.

Another object of the invention is to configure the grommet to fit within a depression extending around an edge of the door.

A further object of the invention is to simplify the manufacturing, assembly and sealing processes of the grommet.

In carrying out this invention in the illustrative embodiment thereof, a grommet is designed for use with a vehicle door having a shallow hollow or depression wrapping around a hinge side of the door to an inner side of the door facing a passenger compartment. The depression has a first part in the hinge side. A semi-circular flange extends around an opening in the hinge side joined to the depression. A second part of the depression is located on the inner side of the door and includes an aperture extending into the door from a bottom of the depression.

The grommet has an elastic seal member for fitting into the first part of the depression. The elastic member includes a semi-circular groove for receiving the flange of the opening to position and help hold the elastic member in the depression. A bellows-type conduit extends from a first end of the elastic member for routing a wire harness away from the door into the vehicle. Sealing fins extend downward from adjacent a second end of the elastic member for pressing against a bottom of the first part of the depression. An open channel extends across a top surface of the elastic member near the second end. The channel is sized to receive a primary door seal or weather strip provided along the hinge side of the door. The sealing fins and weather strip therefore seal a wet side of the door from a dry inner side in a first critical leakage area.

A rigid member has latch features at one end for receipt within the second end of the elastic member and for mating with latch features within the elastic member to secure the two members together. The rigid member has an angled body for guiding the wire harness around the edge of the door. A push-in type fastener extends from an underside of the rigid member for snapping into the aperture in the bottom of the second part of the depression and helping secure the grommet to the door. A seal extends around the fastener to press against the bottom of the depression and seal the inner side of the door from any moisture present within an interior of the door, sealing the passenger compartment at a second critical leakage area.

Sealing moisture out of the vehicle passenger compartment is thus accomplished by sealing only two critical areas. Sealing pressure in the first critical area is applied directly by the shape of the depression against the fins and compression of the primary door seal against the elastic member, eliminating the need for a steel plate and bolts, or a plastic retainer. The only thin edges of the grommet are at the ends of the channel for receiving the weather strip and the fins. Therefore, only a few, smaller size edge protection covers are needed during shipping. Assembly at the wire harness plant does not require feeding circuits through a hole in a steel plate or a fragile grommet. The main sealing edge is confined to one location, around the opening in the hinge side, so manufacturing tolerances are only crucial in that location.

BRIEF DESCRIPTION OF THE DRAWINGS

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
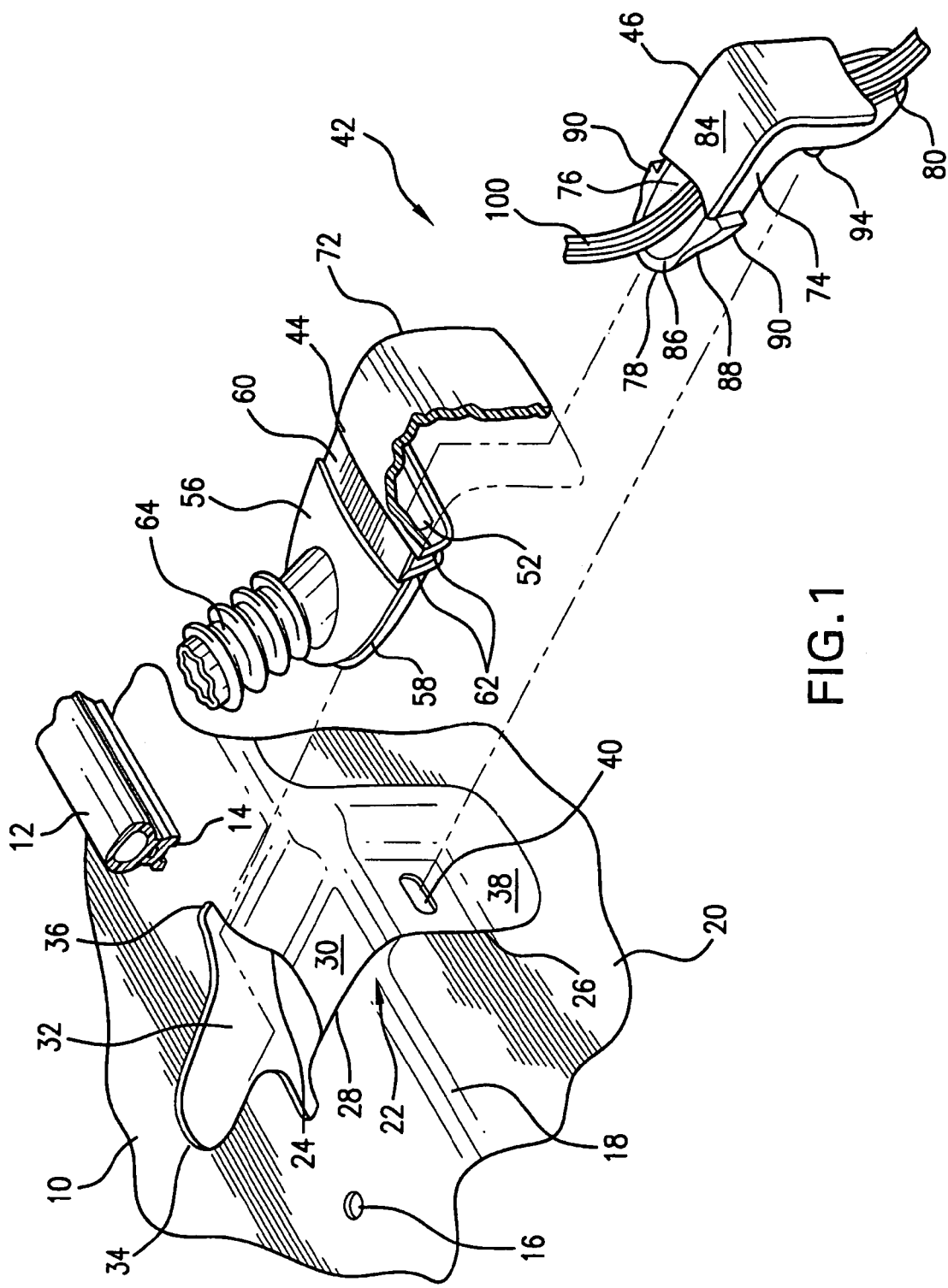
FIG. 1 is an exploded perspective view of a two-piece grommet in combination with a depression formed around an edge of a vehicle door according to the present invention.

Referring now to FIG. 1, a small area of a vehicle door assembly is configured to receive a grommet according to the present invention. The door has a first or hinge side 10 which would include hinge fixtures for attaching the door to a vehicle body so the door can be swung between open and closed positions. A primary door seal or weather strip 12 with a shallow, cup-shaped band 14 is mounted to the hinge side by use of securing holes 16 (only one is shown) and extends along a length of the hinge side. The weather strip 12 seals against the vehicle body and prevents moisture from entering a passenger compartment of the vehicle when the door is in the closed position. An edge or corner 18 of the door transitions the hinge side 10 of the door to a second or inner side 20 of the door. The inner side 20 of the door would face the passenger compartment when the door is closed.

An indentation, hollow or depression 22 is formed in the door and wraps around the corner 18 of the door from the hinge side 10 to the inner side 20. The depression 22 has a first part 24 on the hinge side 10 of the door and a second part 26 on the inner side 20. The first part 24 has a straight portion 28 with a bottom surface 30 adjacent the corner 18. The straight portion 28 leads to an opening 32 through the hinge side 10 spaced from the corner 18. A curved flange 34 extends around a segment of the opening 32. A widened, transition portion 36 of the opening 32 merges with the straight portion 28 such that the opening 32 opens into an interior of the door assembly at the location of the curved flange 32 in a plane parallel to the hinge side 10, and opens into the straight portion 28 of the first part 24 of the depression 22 in a plane perpendicular to the plane of the hinge side. The second part 26 of the depression 22 on the inner side 20 of the door is generally straight and has a bottom surface 38. An aperture 40 extends through the bottom surface 38 to the interior of the door assembly.

Figure 2:
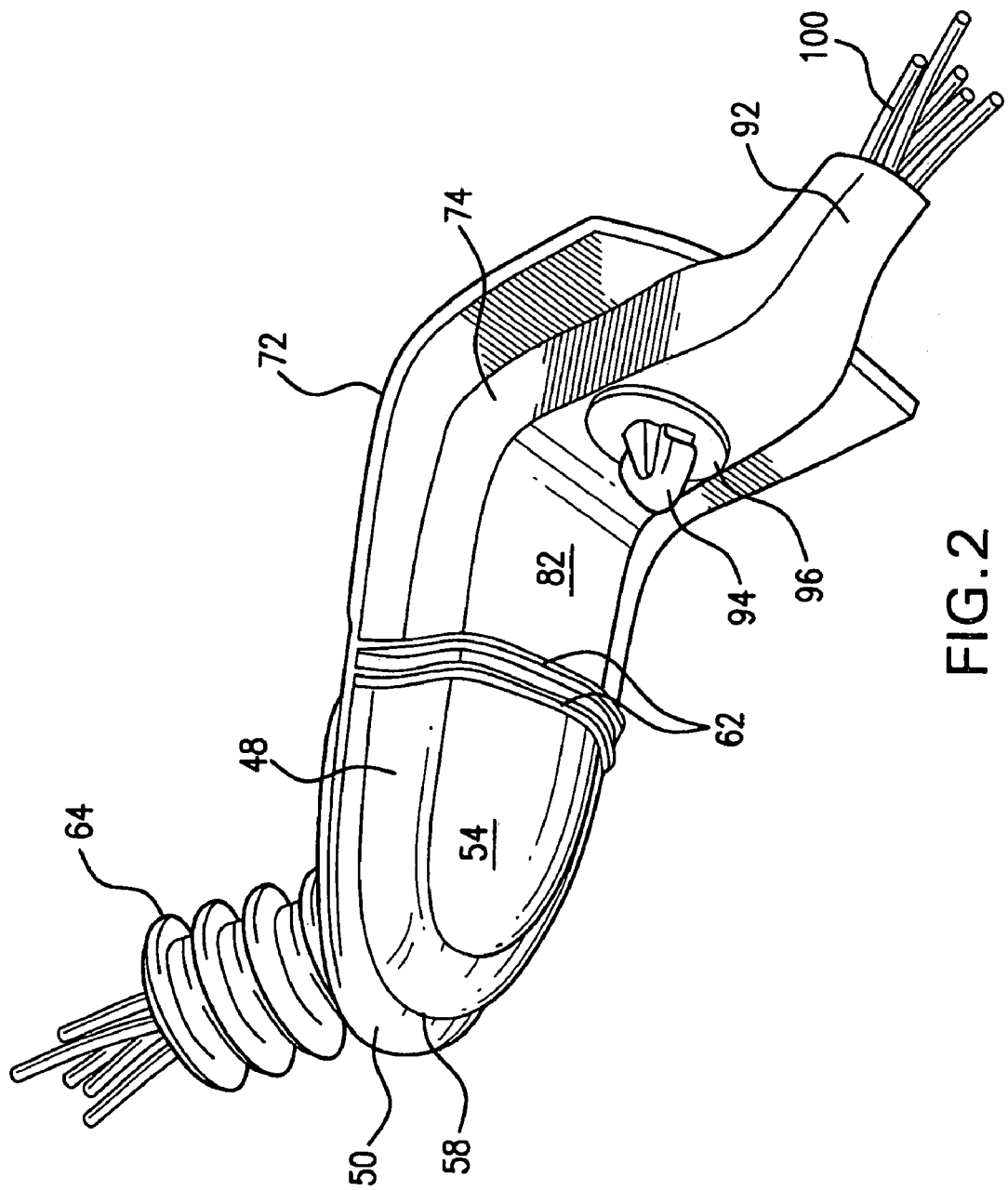
FIG. 2 is an underside view of the assembled grommet.

A grommet 42 according to the present invention is best illustrated in FIGS. 1 and 2. The grommet has a first piece in the form of an elastic seal member 44 and a second piece in the form of a more rigid, retainer member 46. The seal member 44 would be molded from a soft, pliant material such as EPDM rubber, or any suitable material that has the required elasticity and flexibility. The retainer member 46 would be molded from a relatively rigid plastic, for example high-density polyethylene. Alternatively, the retainer member could be molded from rubber also, though it would work best if it were a more rigid rubber than the rubber used for the elastic member.

The seal member 44 of the grommet has a base section 48 sized and shaped to fit into the first part 24 of the depression 22 and the opening 32 on the hinge side 10 of the door. The base section 48 is semi-spherical and has a first, closed end 50, an opposite, second, open end 52, a curved underside 54, and an opposite, upper surface 56. A perimeter of the base section 48 around the closed end 50 has a groove 58 arranged to receive the flange 34 extending around the segment of the opening 32 in the hinge side 10. An open channel 60 stretches across the upper surface 56 of the base section 48 near the second end 52. The channel 60 has a width slightly larger than a width of the cup-shaped band 14 of the weather strip 12 on the hinge side 10 of the door. Sealing projections or fins 62 extend around the curved underside 54 of the base section 48 near the open end 52. There are two fins 62 illustrated, generally enough to provide a reliable seal against the bottom surface 30 of the first part 24 of the depression 22. However, one or more than two fins 62 could be provided depending on the sealing requirements. The thinner grommet edges at each end of the channel 60 and the fins 62 are the only parts of the grommet that are flimsy and need protection during shipping. All other edges of the grommet 42 are thick and durable.

An integral bellows-type tube section or conduit 64 extends from the upper surface 56 of the base section 48. As depicted in the FIG. 3 cross-sectional view of the assembled grommet 42, an opening 66 in the upper surface 56 connects the conduit 64 with an inner passage 68 through the base section 48. As shown in the FIG. 4 cut-away view of the assembled grommet, inner catch ledges 70 (only one is illustrated) form a latch feature on each side within the passage 68. An extension or flap section 72 extends from the upper surface 56 of the base section 48 over the open end 52 and makes a generally right angle downward turn.

Referring again to FIGS. 1 and 2, the rigid retainer member 46 of the grommet 42 has an angled or curved body portion 74 with an inner passage 76. The curved body portion 74 is configured to fit within the straight portion 28 in the first part 24 of the depression 22 and wrap around the corner 18 of the door into the second part 26 of the depression. The curved body portion 74 is illustrated as making an approximately right angle turn, but the angle would depend on the design of the depression 22. The body portion 74 has a first, rounded end 78, an opposite, second open end 80, an underside 82 and an upper surface 84. An opening 86 in the upper surface 84 adjacent the first end 78 communicates with the inner passage 76. An outside perimeter 88 of the opening has a protruding catch element or tab 90 on each side. The second end 80 of the body portion 74 is formed as a circumferential tape lip or tape provision 92. The upper surface 84 of the curved body portion 74 is contoured to match the turn of the flap section 72 of the seal member 44.

Figure 3:
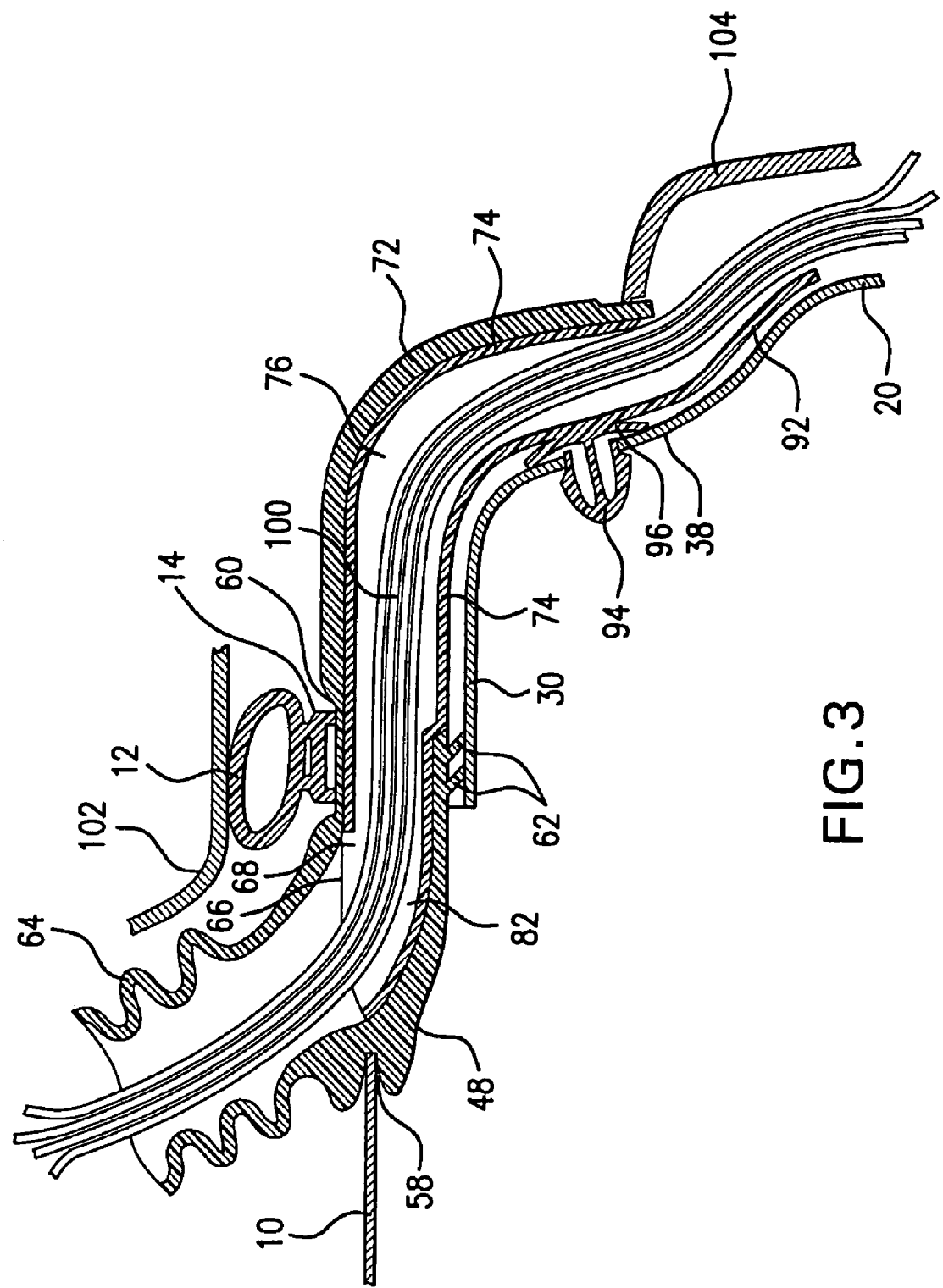
FIG. 3 is a cross-sectional side view of an assembled grommet fit into the depression in the door.

As best illustrated in FIGS. 2 and 3, a fastener 94 is integral with or otherwise attached to the underside 82 of the body portion 74 around the curve from the catch tabs 90. The fastener 94 is illustrated, for example purposes, as being an arrowhead-shaped, push-in type and is sized to snap into the aperture 40 in the bottom surface 38 of the second part 26 of the depression 22. A seal 96, such as an annular and/or suction seal, surrounds the fastener 94 where the fastener is attached to the body portion 74. The seal 96 provides a reliable seal against the bottom surface 38 of the depression around a periphery of the aperture 40, sealing the passenger compartment from any moisture penetrating into the interior of the door assembly.

Figure 4:
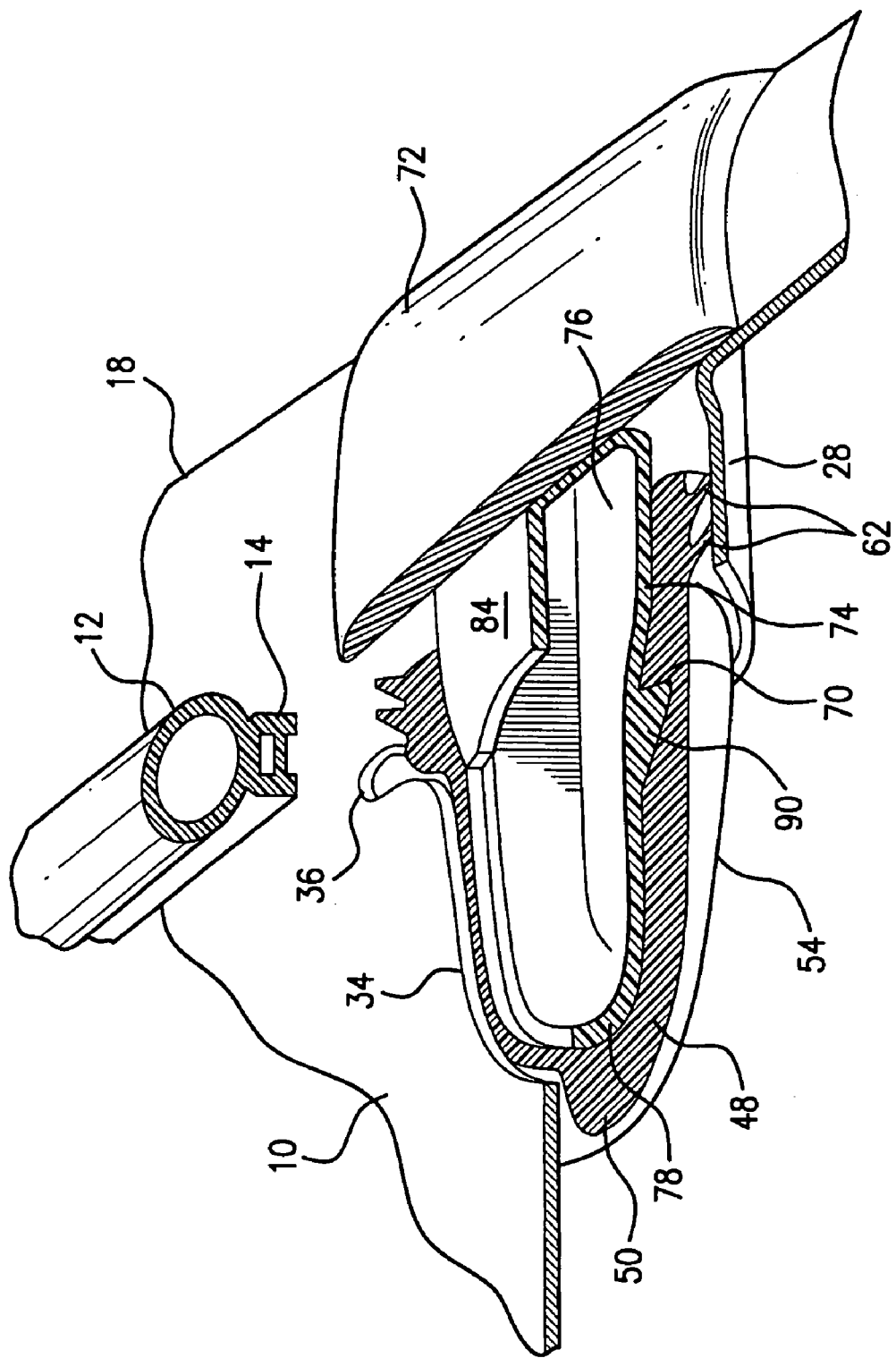
FIG. 4 is a cut-away view of segments of the assembled grommet and door.

In use, a wire harness or bundle of wires 100 is routed through the inner passage 76 of the retainer member 46, as depicted in FIGS. 1-3. Tape may be wrapped around the tape provision 92 to secure the retainer member 46 in position on the harness 100. The seal member 44 is stretched over the harness 100 such that the wires pass through the inner passage 68 and conduit 64. The rounded first end 78 of the retainer member 46 is then inserted into the second end 52 of the seal member 44 under the flap section 72 until the catch tabs 90 of the retainer member snap behind the catch ledges 70 of the seal member, as best illustrated in FIG. 4. The flap section 72 fits over and substantially covers the upper surface 84 of the body portion 74 of the retainer member 46.

With the complementary latch features 70 and 90 of the two members now engaged such that the grommet 42 is fully assembled, the groove 58 around the base section 48 of the seal member 44 is fit on the curved flange 34 of the opening 32 in the hinge side 10 of the door. The fins 62 on the base section 48 press against the bottom surface 30 of the straight portion 28 of the first part 24 of the depression 22. The fastener 94 extending from the underside 82 of the retainer member 46 is pushed into the mounting aperture 40. The seal 96 around the fastener 94 presses against the periphery of the mounting aperture 40. The weather strip 12 is then attached to the hinge side of the door, with the band 14 of the strip passing across the upper surface 56 of the base section 48 of the seal member 44 within the channel 60.

This assembly method of the grommet 42 into the depression 22 and opening 32 on the door ensures that the seal member 44 and the retainer member 46 have been properly, fully mated. The set of fins 62 on the underside 54 of the seal member 44 and the groove 58 around the base section 48 of the seal member provide a waterproof seal in the opening 32 and against the first part 24 of the depression, preventing moisture from reaching the inner side 20 of the door. The seal 96 around the fastener 94 seals against the periphery of the mounting aperture 40 in the second part 26 of the depression. When the weather strip 12 is secured to the hinge side 10 of the door, the seal between the wet side of the door and the dry, inner side 20 is complete. Closing the door causes a vehicle body surface 102 adjacent the door assembly to press the weather strip 12 against the seal member 44, as illustrated in FIG. 3, in turn putting pressure on the fins 62. A suction force is also created between the band 14 of the weather strip and the channel 60 on the seal member 44 to further enhance the seal quality.

A door trim panel 104 is fit on the inner side 20 of the door assembly over the wire harness 100 to hide it from the passenger compartment. The flap 72 of the seal member covers the retainer member 46 and fits under an edge of the trim panel 104 to hide the connection between the grommet members and help prevent moisture from entering the grommet members around their joined surfaces when the door is open. It is important to note that the fastener 94 may not be necessary in some cases. The engagement between the groove 58 and flange 34 and the connection between the grommet members could, in some instances, secure the grommet in position and eliminate the need for the mounting aperture 40. The trim panel 104 acting against the flap 72 of the seal member 44 and the body portion 74 of the retainer member 46 could provide additional stability.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A grommet for fitting into a hollow extending around an edge of a vehicle door, the grommet comprising:
    a first piece having a base section for fitting into the hollow on a first side of the door, the base section having a curved underside, the first piece having at least one elastic fin extending from the curved underside for pressing against the hollow to seal the first side of the door from a second side of the door; and
    a second piece, the second piece including means for directly connecting the second piece with the first piece, the second piece having a curved body portion configured to fit into the hollow and wrap around the edge of the door within the hollow to the second side of the door.

2. The grommet of claim 1 wherein the first piece of the grommet is made from an elastic material and the second piece is made from a relatively rigid material.

3. The grommet of claim 1 wherein the second piece includes a fastener for engaging an aperture in the hollow to secure the grommet to the second side of the door.

4. A grommet comprising:
    a seal member having a first end, a second end, an underside and a surface opposite the underside, the underside having at least one sealing projection located adjacent the second end, the surface having a channel extending across the seal member near the second end, the seal member further including an inner passageway from an opening at the second end to an opening in the surface adjacent the first end;
    a bellows portion extending from the seal member from a location surrounding the opening in the surface adjacent the first end of the seal member; and
    a separate retainer member having a first end with means for directly connecting the retainer member to the second end of the seal member such that the members are engaged, the retainer member further having an angled body extending from the first end of the retainer member to an opposite, second end of the retainer member, and a curved inner passageway extending between openings at each end of the angled body, the angled body having an underside with a fastener protruding from the underside of the angled body to hold the grommet on an assembly with the at least one sealing projection pressed against the assembly.

5. The grommet of claim 4 wherein the retainer member is made of a material more rigid than a material from which the seal member is made.

6. The grommet of claim 5 wherein the seal member is made from a compliant rubber and the retainer member is made from a rigid plastic.

7. The grommet of claim 4 wherein the fastener is integrally joined to the underside of the angled body.

8. The grommet of claim 7 further comprising a seal surrounding the fastener where the fastener is joined to the underside of the angled body.

9. The grommet of claim 4 wherein the at least one sealing projection is an at least one sealing fin formed with the seal member.

10. A grommet for routing wires from a vehicle door to a vehicle body, the door having a depression that wraps around an inner edge of the door from a hinge side to an inner side of the door, the depression having a first part on the hinge side joined to an opening with a peripheral, curved flange, the depression further having a second part on the inner side of the door, the grommet comprising:
- an elastic section having a base section with a curved underside shaped to fit within the first part of the depression, the elastic section further having a groove around a perimeter of the base section and arranged to receive the flange of the opening to hold the elastic section to the hinge side of the door, the elastic section further including an inner passageway for routing the wires to the vehicle body; and
- a retainer section having latch means at one end for directly securing the retainer section to the elastic section, an angled body configured to extend around the edge of the door within the depression, and a curved inner passageway for routing the wires from inside the door through the retainer section to the elastic section of the grommet.

11. The grommet of claim 10 further comprising at least one sealing fin on the underside of the elastic section for sealing against the first part of the depression.

12. The grommet of claim 11 wherein the at least one fin is located adjacent to where the elastic section is secured to the retainer section.

13. The grommet of claim 11 further comprising an open channel across a surface of the elastic section opposite the underside of the elastic section, the channel being sized to receive a portion of a weather strip attached to the hinge side of the door.

14. The grommet of claim 10 further comprising a fastener extending from the angled body for insertion into a mounting aperture in the second part of the depression.

15. The grommet of claim 14 further comprising a seal around the fastener where the fastener is connected to the angled body for sealing against a periphery of the aperture in the second part of the depression.

16. The grommet of claim 10 further comprising a flexible conduit attached to the elastic section and communicating with the inner passageway of the elastic section to route the wires to the vehicle body.

17. The grommet of claim 10 wherein the retainer section is made from a rigid plastic.

18. The grommet of claim 10 wherein the latch means comprise catch tabs on each side of the retainer section for snapping behind catch ledges formed on sides of the inner passageway of the elastic section.

* * * * *